United States Patent [19]

Shedd

[11] Patent Number: 4,519,774
[45] Date of Patent: May 28, 1985

[54] TEMPERATURE ACTUATED BURNER IGNITER

[76] Inventor: Clifford M. Shedd, 5109 Mortier Ave., Orlando, Fla. 32812

[21] Appl. No.: 594,811

[22] Filed: Mar. 29, 1984

[51] Int. Cl.$^3$ .............................................. C06C 9/00
[52] U.S. Cl. .................................... 431/267; 44/3 R; 102/200; 102/205; 126/59.5
[58] Field of Search ....................... 126/269, 59.5, 263; 431/267, 268; 44/3 R; 47/2; 102/200, 205

[56] References Cited

U.S. PATENT DOCUMENTS

| | | | |
|---|---|---|---|
| 1,328,788 | 1/1920 | Bray | 431/267 X |
| 2,480,397 | 8/1949 | Crockett | 431/267 X |
| 2,650,488 | 9/1953 | Crockett | 431/267 X |

Primary Examiner—Larry Jones
Assistant Examiner—Carl D. Price
Attorney, Agent, or Firm—Julian C. Renfro

[57] ABSTRACT

A low cost igniter comprising a multi capsule of low strength, non-porous material, such capsule being divided into at least two separate compartments. One of such compartments is filled with a freezable fluid, and another contains an ingredient that will function in the presence of a selected ingredient to bring about combustion. The ingredient in the capsule is disposed in the immediate vicinity of the second ingredient, so that on the occasion of a freezing temperature, the freezable fluid in the compartment of the capsule will freeze and expand, fracturing all components of the capsule substantially simultaneously, thus leading to a combination of the first and second ingredients, as will bring about immediate combustion. When the multi capsule is configured to have two compartments, the second ingredient is contained adjacent the capsule, but when the multi capsule has three compartments, the freezable fluid as well as both ingredients are each sealed in separate compartments of such capsule.

20 Claims, 10 Drawing Figures

TEMPERATURE ACTUATED BURNER IGNITER

BACKGROUND OF THE INVENTION

It is well known that many crops must be protected from freezing weather. In instances in which the crops are citrus fruit or tomatoes, for example, it is conventional to utilize combustion devices in the nature of smudge pots or other burners in the winter season, for such devices can serve the important function of raising the ambient temperature around the trees or plants by a few degrees, thus to prevent a substantial amount of the crop being lost.

Obviously, the proper igniting of the burners or smudge pots is a matter of critical importance, for if the burners are not activated when weather conditions approach a critical temperature, the entire crop could be jeopardized. On the other hand, if the burners are needlessly activated, this also represents a sizable expense, for a substantial amount of labor has customarily been involved in the lighting of burners, and likewise substantial amounts of labor are involved in turning them off, refilling same, and preparing them for the next cycle of use.

Various attempts have been made to mechanize the procedure for activating the burners when such are needed, but not only have such devices been quite expensive and difficult to maintain in the proper working order, but also it is quite difficult to "fine tune" such prior art devices such that they on the one hand will not needlessly ignite the burners, but on the other hand, will serve to consistently activate the burners when temperature conditions indicate a necessity for their use.

It was in an attempt to overcome the problems associated with these prior art ignition devices for burners that the present invention was evolved.

SUMMARY OF THIS INVENTION

In accordance with this invention, I have provided a type of igniter that combines the qualities of low cost, reliable operation, virtually no maintenance, and easy recycling preparatory to the next expected freeze.

My device involves no moving parts, and no metallic parts, and principally entails a multi capsule device that upon being fractured by freezing temperature, will bring about a dissemination of a component that will reliably bring about a flame serving to ignite the fuel of a burner.

My novel multi capsule arrangement involves the use of a low tensile strength material, such as glass or porcelain, that can be depended upon to fracture at the appropriate time. A first compartment of the capsule is completely filled with a freezable fluid, such as water, or water with another substance that will suitably alter the freezing point of the mixture. A second compartment, contiguous to the first, contains an ingredient that will function in the presence of a selected additional ingredient to bring about combustion. Such selected additional ingredient may be contained in a pool in which the capsule floats, or alternatively, a triple capsule may be used in which the selected ingredient is contained in a third compartment of the capsule.

When the freezable ingredient contained in the first compartment freezes at a preascertained low temperature, this is accompanied by a significant amount of expansion, that causes capsule breakage.

As a result of this capsule breakage, the fuel of the second compartment is contacted by a catalyst, causing a spontaneous conflagration that will serve to ignite a volatile fuel disposed in the immediate vicinity of the fuel ignited by the catalyst. The ignition of the volatile fuel causes a sufficient flame as to reliably ignite the fuel of the burner.

It is therefore to be seen that the principal object of this invention is the providing of an igniter for a burner, which igniter is dependable in operation, economical to produce, and easy to maintain.

It is another object of this invention to provide a burner igniter that has no moving parts, and that will not "false alarm".

It is yet another object of this invention to provide a low cost igniter device effectively utilizing the expansion accompanying the freezing of a liquid, that will reliably result in contact between two ingredients selected to bring about essentially instantaneous combustion at the time of a freeze.

It is still another object of this invention to provide a low cost igniter for a burner that does not need to have a meticulous relationship to the burner with which it is used, with it being but a simple matter to thereafter recycle the burner so that it will be ready for the next freeze.

These and other objects, features and advantages will be more apparent as the description proceeds.

DETAILED DESCRIPTION

Figure 1:
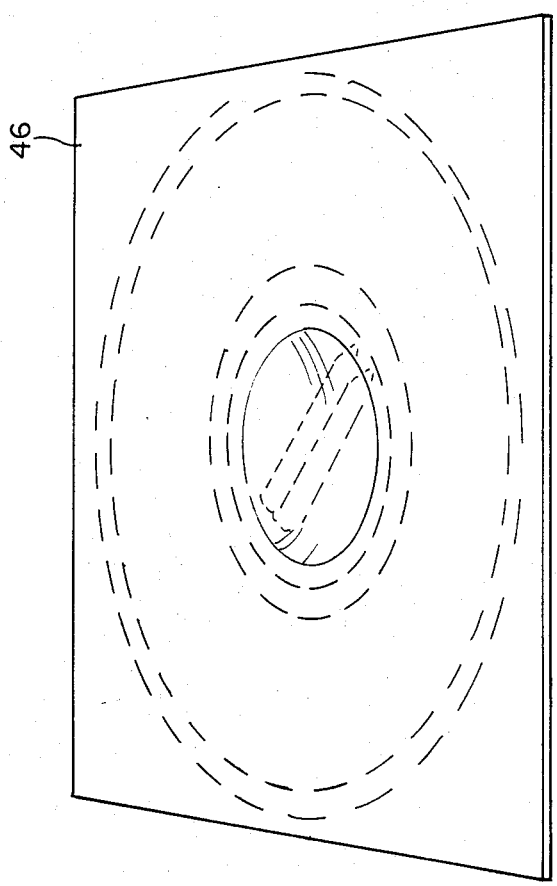
FIG. 1 is an isometric view of a first embodiment of my igniter, illustrating a generally round base member, as well as significant relationships between its several components.
Figure 3:
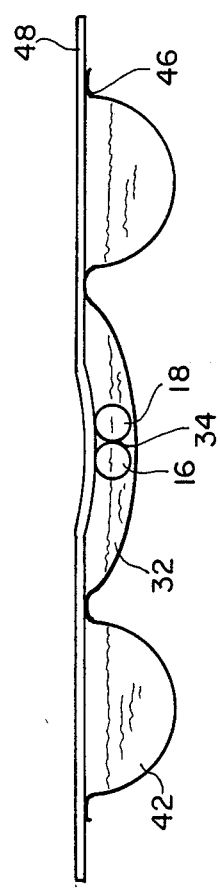
FIG. 3 is an isometric view of an igniter embodiment that is generally square.

Turning to FIG. 1, it will there be seen that I have provided an igniter 10, which may be round, although it may be of generally square or rectangular configuration, as shown in FIG. 3. The device is preferably light enough to float on most known liquids.

The base member 11 of the device 10 is configured to define an enclosed central well or pool 12, and in such compartment I may place a multi capsule 14 of low tensile strength material, such as of glass, porcelain, or certain suitable ceramics. A double capsule is shown in greater detail in FIGS. 5 and 5a, with this capsule containing two distinctly different fluids. A triple capsule embodiment of this invention is shown in FIGS. 6 and 6a.

In the central pool 12 may be contained a fluid 20 in which the multi capsule 14 floats. The base member or protective envelope 11 is preferably made of plastic, and is configured such that surrounding the pool 12 is a generally toroidally shaped chamber 22, which contains a combustible liquid 24. These aspects of my invention will be discussed at greater length hereinafter.

Compartment 16 of the double capsule 14 is completely filled with a fluid that can be dependent upon to freeze at a preestablished low temperature, and in compartment 18 is placed an ingredient that will function in the presence of a selected second ingredient to immediately bring about combustion. Upon freezing taking place, a significant amount of expansion quite expectedly occurs as a result of the change of state in compartment 16, thus causing a fracturing of the double capsule, and a freeing of the contents of compartment 18. This first ingredient, which may be a suitable catalyst, will then interact with the second ingredient, typically a fuel located in compartment 12. This causes a conflagration, and shortly thereafter, an ignition of the contents of the toroidal chamber 22, which may be gasoline. This brings about a substantial blaze, as will reliably ignite the burner in connection with which my device is used.

Although water could be the only fluid encapsulated in compartment 16, I frequently prefer to mix therewith, a certain percentage of another ingredient that will serve to desirably modify the freeze point. For example, a certain percentage of alcohol or other such antifreeze type ingredient could be added if the freeze point is to be lowered, or instead, salt could be used. On the other hand, a certain amount of sodium hydroxide could be added to the water if the freeze point is to be raised. In this way I can bring about the rupturing of the double capsule 14 at a desirably low temperature, but at the same time prevent an ignition of the burner at a temperature sufficiently above the freezing point of a certain crop, that the crop would not have been endangered by frost or cold.

Alternatively, I can use a fluid entirely different from water in the freeze compartment of the capsule if particularly low temperatures are to be involved. For example, if storage batteries are to be protected by a heat source from temperatures lower than say −40° F., I could use a fluid such as glycol in the capsule compartment 16.

Since the low temperature conditions warranting thermal protection of one crop may be different from the low temperature conditions warranting thermal protection for another crop, I may well utilize a coloring agent in the freeze compartment 16, thus to indicate preferred usage of the device. For example, if my igniter is to be utilized in conjunction with an orange grove, the freeze fluid may be colored orange, whereas for use in the protection of a tomato crop, the freeze fluid could be colored red. Alternatively or in addition, the base member 11 could itself bear a color code.

The capsule compartment 16 is bonded substantially along its entire length to a virtually identical compartment 18 of the double capsule, and in the latter is preferably contained a suitable catalyst that will rapidly interact with fuel disposed nearby. Alternatively, the capsule compartment 18 could contain the fuel to interact with a nearby catalyst, but such is ordinarily not the preferred arrangement, for a catalyst is normally more volatile than the fuel.

Because the freezable fluid contained in the capsule compartment 16 completely fills that compartment, and that fluid is selected to solidify at some freeze temperature, for example, in the general vicinity of 32° F. if water is the principal ingredient, the compartment 16 will rupture and break when the fluid expands at the time of freezing at the preascertained low temperature, and at the same time causing a rupturing and breaking of the compartment 18 in which the catalyst (or fuel) is contained. So that the compartment 16 of the frangible double capsule will not break without at the same time breaking the compartment 18, I may prefer to scratch or scribe the surfaces of the two compartments so that breakage of the compartment 18 at the prescribed low temperature will assuredly be brought about. Quite obviously I am not to be limited to such an arrangement, and as one alternative, I may make the double capsule device of tempered glass, that will shatter into very small pieces at such time as the freeze point of the fluid in compartment 16 is reached.

Figure 2A:
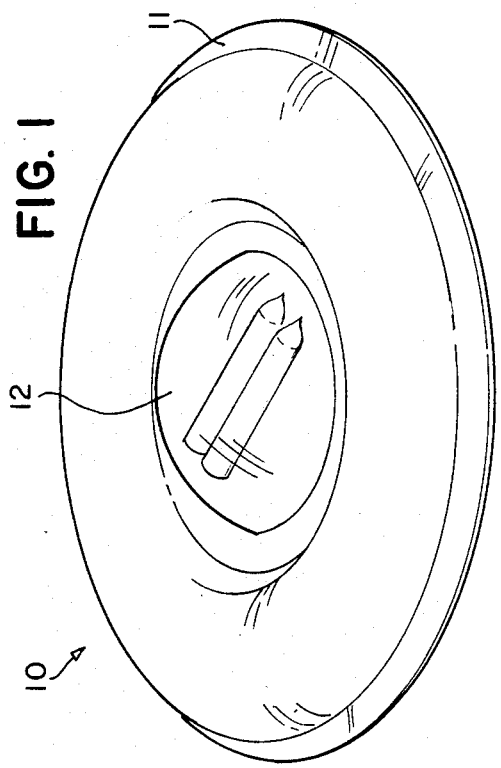
FIG. 2a is a cross sectional view of the igniter of FIG. 1, revealing the configuration of the chambers, and the double capsule that floats in the central chamber of the igniter.
Figure 2B:
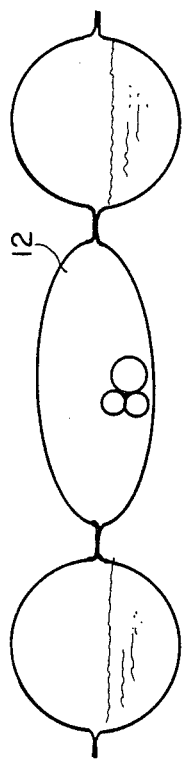
FIG. 2b is a cross sectional view of a device similar to the device of FIG. 2a, but revealing the use of a triple capsule, and the omission of fluid from the central chamber.

FIG. 2b reveals that my multi capsule can take the form of three separate compartments secured tightly together, with one compartment containing water that, when it freezes, causes the fracturing of all three capsule compartments. Fuel can be contained in a second compartment, and the catalyst in a third compartment of the capsule. Note FIGS. 6 and 6a. No pool of either fuel or catylist need be contained in the compartment 12 of the base member in such instance.

As should now be clear from FIGS. 1 and 2a, the base member 11 of device 10 is configured, such as by vacuum forming, so as to define a suitable central pool 12, in which the fuel, such as a hypergolic fuel is contained. The double capsule package 14 may reside in the fuel in this pool, with latter fuel being of such a nature so as to cause an immediate ignition and flame. For example, the ingredient contained in capsule compartment 18 may be red fuming nitric acid (RFNA), whereas the fuel in the pool 12 may be aniline. Upon these two ingredients, a fuel and a catalyst coming into contact, sizable flame immediately results. Obviously, I am not to be limited to these ingredients, for the compartment 18 of the double capsule could contain brake fluid, and the pool 12 contain a form of chlorine, such as a powered version of this chemical. Also, a triple capsule could be utilized, as discussed hereinafter.

The base member 11, which may be regarded as a combustible protective envelope, is configured such that surrounding the pool 12 is a toroidal chamber 22, as previously mentioned, that is preferably arranged in the general manner shown in FIG. 2a. A very volatile fuel, such as gasoline, is the preferred fuel for utilization in chamber or compartment 22, although other volatile fuels could be selected for this purpose. Importantly, and as will be noted from FIGS. 2a and 2b, the toroidal chamber 22 is of a greater height than that of the central chamber 12, so that the central chamber will be clear of the surface of the Diesel fuel (or other such fuel) in which the device floats. Because the chamber 12 does not touch the surface of the fuel, the fuel upon which my device floats will not serve to prevent the freezing of the contents of the freeze chamber of the multi capsule 14.

The ingredients used in the pool 12 and the toroidal ring 22 are prevented from spilling by the encapsulation thereof utilizing a domed plastic member that is essentially the same configuration as the bottom of the member 11. Note FIGS. 2a and 2b. This plastic is impervious to gasoline and other petroleum products, such as polypropylene or mylar, and is sealed to the lower portions of the base member 11.

Because of this symmetry of this embodiment, it can float, such as in a pool of Diesel fuel, in either orientation.

The reaction between the catalyst and fuel, RFNA and aniline in the preferred instance, is predictably a flame sufficiently large as to assure the ignition of the highly volatile ingredient contained in the toroidal chamber 22. Then, upon the ingredient in chamber 22 being ignited, a sufficiently larger flame is created as will assure ignition of the fuel used in the burner, smudge pot, or other such device. The combustible plastic base member 11 as well as its covering will be consumed by the flames, and very little residue will be left.

Turning to the embodiment of FIG. 3, it will be seen that the base member 46 is generally rectangular or square, with the lower portion of this device containing as before, a central pool as well as a toroidially shaped compartment. The central pool 32 may contain aniline, and one compartment of the double capsule may contain RFNA, such that upon rupture of the double capsule due to freezing, an intense flame will be created. Since the base member 46 of this embodiment is of plastic, it will readily burn, causing the gasoline or other such fuel in the toroidal chamber 42 to ignite. The resulting blaze will dependably cause ignition of the Diesel fuel or the like, upon which the device may be floating.

Figure 4:
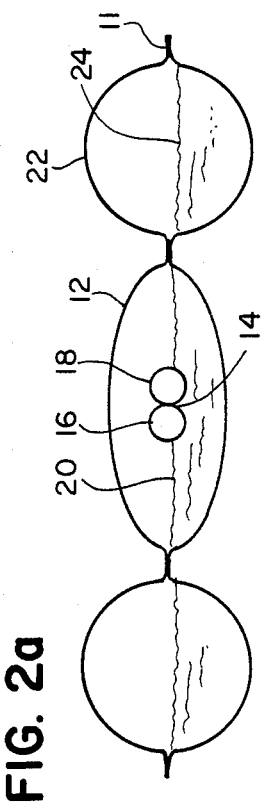
FIG. 4 is a cross sectional view of the device of FIG. 3, revealing an embodiment in which the upper surface of the base member is substantially flat.

The embodiment of FIGS. 3 and 4 entails the upper portion 48 of the base member being flat, with the central portion of the upper member preferably being somewhat depressed, such that the double capsule 34 will desirably be held in a single position. However, this is not required. Also, it is to be noted that a triple frangible capsule in accordance with this invention may be used in the device of FIG. 4.

Figure 5:
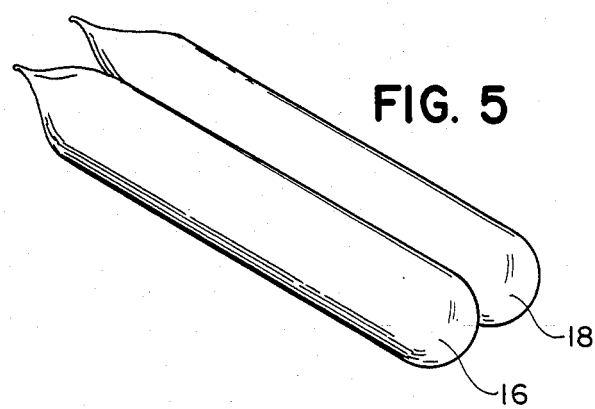
FIG. 5 is an isometric view of a double capsule in accordance with this invention.
Figure 5A:
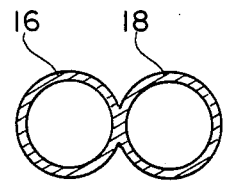
FIG. 5a is a cross sectional view of the embodiment of FIG. 5.
Figure 6:
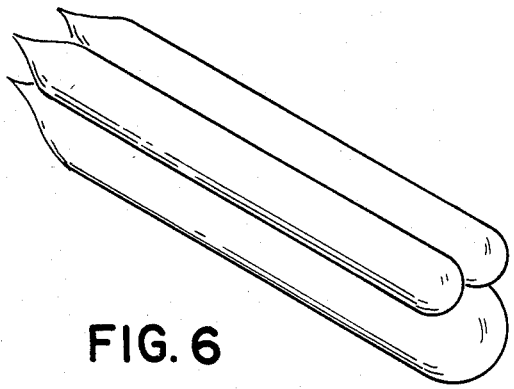
FIG. 6 is an isometric view of a triple capsule in accordance with this invention.
Figure 6A:
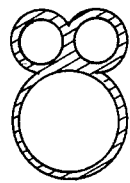
FIG. 6a is a cross sectional view of the triple capsule of FIG. 6.
Figure 7:
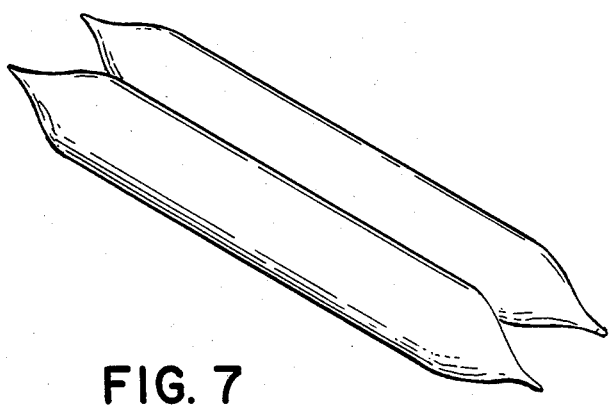
FIG. 7 is an isometric view of a capsule, revealing that both ends of the capsule may be pinched off.

Although the frangible capsules shown in FIGS. 5 and 6, and other figures show one rounded end, it is to be realized that both ends of the tubes could be pinched off, as shown in FIG. 7.

It is therefore to be seen that I have provided a low cost igniter that will reliably bring about the ignition of burners of a variety of types upon the onset of freezing weather, with this being accomplished at a minimum of cost.

I claim:

1. A low cost igniter comprising a multi capsule of low strength material, said capsule being divided into at least two separate compartments, with one of said compartments being filled with a freezable fluid, and another of said compartments containing a first ingredient that will function in the presence of a selected second ingredient to bring about combustion, said compartment containing said first ingredient being disposed in the immediate vicinity of a quantity of said selected second ingredient, so that on the occasion of a freezing temperature, the freezable fluid in said capsule will freeze and expand, fracturing the compartments of said capsule substantially simultaneously, thus leading to a combination of the first ingredient with the selected second ingredient, as will bring about immediate combustion.

2. The igniter as defined in claim 1 in which said multi capsule is made of glass.

3. The igniter as defined in claim 1 in which said multi capsule is made of a ceramic material.

4. The igniter as defined in claim 1 in which said multi capsule is made of porcelain.

5. The igniter as defined in claim 1 wherein said multi capsule has two separate compartments.

6. The igniter as defined in claim 1 wherein said multi capsule has three separate compartments in which the first ingredient and the selected second ingredient that will cause combustion when combined are each disposed in separate compartments of said capsule.

7. The igniter as defined in claim 1 in which said freezable fluid is principally water.

8. The igniter as defined in claim 7 in which alcohol is added to the water in order to depress the temperature at which freezing, with consequent fracture of the capsule, will take place.

9. The igniter as recited in claim 7 in which a substance is added to the water in order to raise the temperature at which freezing, with consequent fracture of the capsule, will take place.

10. The igniter as defined in claim 1 in which said multi capsule is contained in a sealed first compartment of a base member, said first compartment also containing said selected second ingredient, such that the first and selected second ingredients can readily combine, upon occasion of capsule fracture, with the result that combustion readily takes place.

11. The igniter as defined in claim 10 in which said base member also has a sealed second compartment, with a highly volatile fuel contained therein, such that a substantial flame results from the fracturing of the capsule, and ensuing ignition.

12. The igniter as defined in claim 11 in which the sealing of compartment of the sealed first and the sealed second said base member is accomplished by the use of a substantially flat plastic cover serving to tightly enclose the separate compartments of said base member.

13. The igniter as defined in claim 11 in which the sealing of compartment of the sealed first and the sealed second said base member is accomplished by the use of a somewhat concave plastic cover serving to tightly enclose the separate compartments of said base member.

14. The igniter as defined in claim 11 in which a domed plastic cover, approximately the same configuration as said base member, accomplishes the sealing of the separate compartments of said base member.

15. A low cost igniter comprising a multi capsule of low strength material enclosed in a combustible protective envelope, said capsule being divided into at least two separate compartments, with one of said compartments being filled with a freezable fluid, and another of said compartments containing a first ingredient that will function in the presence of a selected second ingredient to bring about combustion, said compartment containing said first ingredient being disposed in the immediate vicinity of a quantity of said selected second ingredient, so that on the occasion of a freezing temperature, the freezable fluid in said capsule will freeze and expand, fracturing the compartments of said capsule substantially simultaneously, thus leading to a combination of the first ingredient with the selected second ingredient, as will bring about immediate combustion.

16. The igniter as defined in claim 15 wherein said multi capsule has two separate compartments.

17. The igniter as defined in claim 15 wherein said multi capsule has three separate compartments in which said first ingredient and said selected second ingredient associated with combustion are disposed in separate compartments of said capsules.

18. The igniter as defined in claim 15 in which said multi capsule is contained in a sealed first compartment of said protective envelope, said first compartment of said protective envelope also contains the selected second ingredient, such that the first and selected second ingredients can readily combine, upon occasion of capsule fracture, with the result that combustion quickly takes place.

19. The igniter as defined in claim 18 in which said protective envelope also has a sealed second compartment, with a highly volatile fuel contained therein, such that a substantial flame results from the fracturing of the multi capsule, and ensuing ignition.

20. The igniter as defined in claim 19 in which the sealing of the compartments of said protective envelope is accomplished by the use of a plastic cover serving to tightly enclose the separate compartments.

* * * * *